United States Patent
Zaban et al.

(10) Patent No.: US 7,662,316 B2
(45) Date of Patent: Feb. 16, 2010

(54) METHOD FOR PREPARATION OF STABLE METAL OXIDE NANOPARTICLES SUSPENSIONS

(75) Inventors: Arie Zaban, Shoham (IL); Larissa Grinis, Rishon Lezion (IL); Asher Ofir, Moshav Nehalim (IL)

(73) Assignee: 3GSolar Ltd., Jerusalem (IL)

( * ) Notice: Subject to any disclaimer, the term of this patent is extended or adjusted under 35 U.S.C. 154(b) by 0 days.

(21) Appl. No.: 11/997,757

(22) PCT Filed: Aug. 3, 2006

(86) PCT No.: PCT/IL2006/000898

§ 371 (c)(1),
(2), (4) Date: Feb. 4, 2008

(87) PCT Pub. No.: WO2007/015248

PCT Pub. Date: Feb. 8, 2007

(65) Prior Publication Data

US 2008/0224104 A1    Sep. 18, 2008

Related U.S. Application Data

(60) Provisional application No. 60/705,190, filed on Aug. 4, 2005.

(51) Int. Cl.
*H01B 1/12* (2006.01)
*H01B 1/20* (2006.01)

(52) U.S. Cl. ............. 252/519.3; 252/518.1; 252/519.5; 252/520.1; 252/520.2

(58) Field of Classification Search ............... 252/519.3, 252/518.1, 519.5, 520.1, 520.2
See application file for complete search history.

(56) References Cited

U.S. PATENT DOCUMENTS

| 6,258,237 B1 * | 7/2001 | Gal-Or et al. ............... 204/548 |
| 6,410,086 B1 * | 6/2002 | Brandon et al. .......... 427/248.1 |
| 7,147,805 B2 * | 12/2006 | Miyoshi .................. 252/520.1 |
| 7,169,327 B2 * | 1/2007 | Ito et al. .................... 252/500 |
| 2006/0073667 A1 * | 4/2006 | Li et al. ....................... 438/311 |

FOREIGN PATENT DOCUMENTS

CN    101295586 A  *  10/2008
JP    2002121696 A  *  4/2002

OTHER PUBLICATIONS

PCT International Search Report, International Preliminary Report on Patentability, and Written Opinion, mailed Jul. 2, 2007.*
Chemical Abstracts, AN 1983:415388, May 12, 1984.*
Kirk-Othmer Encyclopedia of Chemical Technology, 4th ed., 1997, John Wiley and Sons, v. 23, pp. 478-480.*
Kamada et al., Fabrication of metal oxide-diamond composite films by electrophoretic deposition and anodic dissolution, J. Mater. Res., 18, 12 (Dec. 2003), 2826-2831.*

* cited by examiner

*Primary Examiner*—Douglas Mc Ginty
(74) *Attorney, Agent, or Firm*—Browdy and Neimark, PLLC

(57) ABSTRACT

The invention relates to a method for the preparation of stable suspensions of metal oxide nanoparticles, in which uncharged metal oxide nanoparticles are first treated with a non-ionic surfactant in a polar organic solvent under certain conditions, and the suspension obtained is then treated with a charging solution. The suspensions of the invention can be used for preparation of high quality metal oxide films by electrophoresis deposition (EPD).

14 Claims, 1 Drawing Sheet

METHOD FOR PREPARATION OF STABLE METAL OXIDE NANOPARTICLES SUSPENSIONS

FIELD OF THE INVENTION

The present invention relates to a method for the preparation of stable suspensions of metal oxide nanoparticles.

BACKGROUND OF THE INVENTION

Stable suspensions of metal oxide nanoparticles are important for a variety of applications and processes. Basically, the formation of stable suspensions can be achieved by two methods (alone or together): electrical charging of the surface to cause coulombic repulsion between the particles and steric effects that are usually achieved by the adsorption of organic materials on the nanoparticles surface. Depending on the material and application, one should choose the preferred method with the understanding that the adsorption of materials on the particles surface induces impurities to the system. For some applications such as optic, electronic, optoelectronic, solar energy conversion and others, it is important to process at low temperatures (around 500° C. for inorganic devices and less than 150° C. for plastic based systems) and minimize the contamination of final products with non-volatile impurities.

One of the possible applications of stable suspensions of charged metal oxide particles is electrophoretic deposition (EPD). EPD is a useful way for the preparation of thick binder-free particulate films on conductive substrates. In the EPD method, the charged particles in suspension are moved to the substrate by the applied voltage, and then are deposited on the substrate. In this case, particle charging provides two effects: coulombic repulsion for the formation of a stable suspension and charging that allows particles movement to the opposite charged electrode. No deposition of the particles by EPD occurs if they are not charged.

A wide variety of additives can be used to charge particles and thus produce well-dispersed suspensions (Sarkar and Nicholson, 1996; Zhitomirsky, 2002; Koura et al., 1995; Zhitomirsky, 1998; Special Issue on "Electrophoretic Deposition: Fundamentals and Applications", 2004). Most of the dispersing and charging additives are oligomeric or polymeric ionic or polar organic compounds, such as polyethylenimine, phosphate ester, poly(dimethyl-diallylammonium chloride), trioxadecanoic acid and acrylate-acrylamide copolymers. These dispersing and charging additives are usually applied for a dense ceramics producing, and removed during sintering at high temperatures (1200-1700° C.).

A general system composed of iodine, acetone and water as additives for metal oxide particles charging in suspensions with polar organic liquid is also known (Zhitomirsky, 2002; Koura et al., 1995; Zhitomirsky, 1998). The advantage of this composition derives from the ability to remove all of its components from produced metal oxide films at quite low temperature.

SUMMARY OF THE INVENTION

It has now been found, while developing a low temperature processing of metal oxide nanoporous films, that using only iodine, acetone and water as additives is not enough for preparation of stable suspensions and subsequent high quality metal oxide films by EPD process. It was found that it is very important for these purposes to apply at least one more stage in the preparation process of stable metal oxide nanoparticles suspensions.

Thus, the present invention relates to a method for the preparation of a stable suspension of metal oxide nanoparticles, comprising:
(i) treatment of metal oxide nanoparticles with a non-ionic surfactant in a polar organic solvent, under conditions that break aggregated particles into separate ones and enhance surfactant adsorption on the particle surface; and
(ii) addition of the suspension obtained in step (i) to a charging solution consisting of iodine, acetone and deionized water in a polar organic solvent, under mixing, followed by sonication of the suspension.

DETAILED DESCRIPTION OF THE INVENTION

Figure 1:
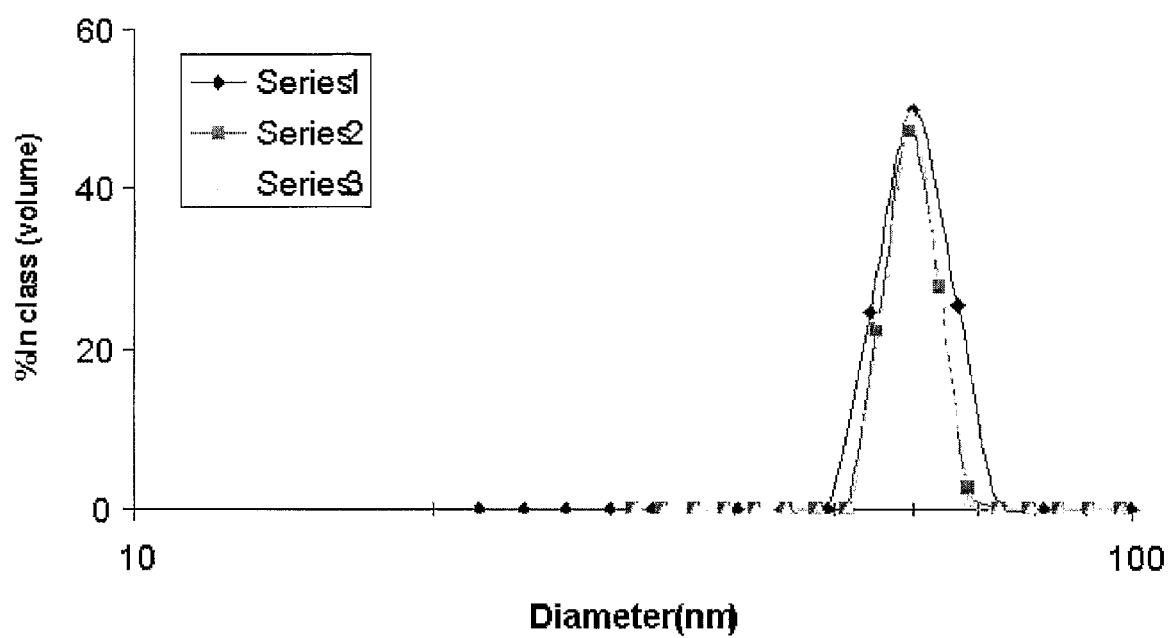
FIG. 1 shows the distribution of $TiO_2$ particle size in the final suspension prepared by the method described in Example 1 hereinafter, as measured by Zetasizer 3000 HS, 30 min after suspension preparation and in two additional consequent measurements (series 1-3 refer to the three consequent measurements, respectively).

The present invention relates to a method for the preparation of a stable suspension of metal oxide nanoparticles, designed for minimization of contamination of final products fabricated from these suspensions with non-volatile impurities at relatively low temperatures processing.

The metal oxide that can be used according to the present invention may be, without being limited to, an oxide of a transition metal, Al, In, Sn, Mg, Be, B, Si or a mixture thereof with various compositional ranges. In a preferred embodiment, the metal oxide is an oxide of a transition metal such as Sc, Ti, V, Cr, Mn, Fe, Co, Ni, Cu or Zn, more preferably, titanium oxide. In another embodiment, the metal oxide is tin oxide, optionally doped by antimony, or indium-tin oxide.

The polar organic solution, in which the uncharged metal oxide nanoparticles are suspended, is composed of a polar organic solvent and a non-ionic surfactant.

The polar organic solvent may be, without being limited to, any straight or branched $C_1$-$C_6$ alkanol such as methanol, ethanol, propanol, isopropanol, butanol, isobutanol, sec-butanol, tert-butanol, pentanol, neopentanol, sec-pentanol, hexanol and mixtures thereof. In a preferred embodiment, the polar organic solvent is ethanol.

The selection of the non-ionic surfactant is based on the affinity and the adsorption of this substance to the metal oxide surface in order to prepare (modify) the surface of the metal oxide particles for the charging step, i.e. to change the surface properties of the metal oxide particles, apparently, in order to facilitate the adsorption of protons or iodide ions on the particles surface and/or to create a steric repulsion. Such a surfactant forms chelate or complex bonds with the metal atom of the metal oxide, and is specific for a given metal. It should be noted that the surfactant should be selected such that it does not noticeably increase the ionic strength of the suspension, because increase of the ionic strength of the suspension results in reduced thickness of the electrical double layer of particles, and in particle coagulation and sedimentation. The preferred non-ionic surfactants are acetylacetone, ethyleneglycol or similar compounds.

The treatment of the metal oxide nanoparticles with the non-ionic surfactant in the polar organic solvent is carried out under conditions that break aggregated particles into separate ones and enhance surfactant adsorption on the particle surface. Such conditions include stirring, milling and/or ultrasound sonication conditions, and are preferably stirring and/or sonication conditions.

It is worth noting that, in some cases, this treatment alone is not enough to obtain stable metal oxide particles suspensions. In such cases, it is useful to clean initially the surface of the particles from organic and, sometimes, inorganic impurities. This is typically achieved by thermal treatment or a treatment with an inorganic acid and/or a non-ionic surfactant, followed by washing with deionized water and thermal treatment.

Therefore, the present invention further relates to a method for the preparation of a stable suspension of metal oxide nanoparticles, as defined herein, wherein said nanoparticles are initially treated for cleaning of their surface from impurities by thermal treatment, or with an inorganic acid and/or a non-ionic surfactant, followed by washing with deionized water and a thermal treatment.

The inorganic acid which can be used for the initial treating of the metal oxide nanoparticles may be, without being limited to, nitric acid or hydrochloric acid, and the non-ionic surfactant that may serve for the same purpose may be, without being limited to, acetylacetone or ethyleneglycol.

The uncharged metal oxide nanoparticles suspension obtained in step (i) of the method of the invention is treated in step (ii) with a charging solution consisting of iodine, acetone and deionized water in a polar organic solvent. It should be understood that the polar organic solvent used in the charging solution in step (ii) may be identical to or different from the polar organic solvent used for suspending the uncharged metal oxide nanoparticles in step (i).

In one embodiment of the invention, the metal oxide is titania ($TiO_2$), the polar organic solvent is ethanol, the non-ionic surfactant is acetylacetone, the treatment of the metal oxide nanoparticles according to step (i) above is performed using a magnetic stirrer and sonication, and the uncharged suspension obtained is treated with an ethanol-based charging solution.

In another embodiment, the metal oxide is antimony-doped tin oxide, the polar organic solvent is ethanol, the non-ionic surfactant is ethyleneglycol, the treatment of the metal oxide nanoparticles according to step (i) above is performed using a magnetic stirrer and sonication, and the uncharged suspension obtained is treated with an ethanol-based charging solution.

In a further embodiment, the metal oxide is indium-tin oxide, the polar organic solvent is ethanol, the non-ionic surfactant is acetylacetone, the metal oxide nanoparticles are initially treated by thermal treatment for removal of adsorbed water and organic impurities, the treatment of the metal oxide nanoparticles according to step (i) above is performed using a magnetic stirrer and sonication, and the uncharged suspension obtained is treated with an ethanol-based charging solution.

In another embodiment of the invention, the metal oxide is titania, the polar organic solvent is methanol, the non-ionic surfactant is acetylacetone, the treatment of the metal oxide nanoparticles according to step (i) above is performed using a magnetic stirrer and sonication, and the uncharged suspension obtained is treated with a methanol-based charging solution.

In a further embodiment of the invention, the metal oxide is titania, the polar organic solvent is isopropanol, the non-ionic surfactant is acetylacetone, the treatment of the metal oxide nanoparticles according to step (i) above is performed using a magnetic stirrer and sonication, and the uncharged suspension obtained is treated with an ethanol-isopropanol mixture (1:1 w/w) based charging solution.

The invention will now be illustrated by the following non-limiting Examples.

EXAMPLES

Example 1

Preparation of a Stable Titania Nanoparticles Suspension Using an Ethanol-based Charging Solution 0.65 g of commercially available titania nanopowder P-25 (Degussa AG, Germany) was mixed with 150 ml of ethanol and 0.4 ml of acetylacetone, and stirred with magnetic stirrer for 24 h in a closed vessel (herein "P-25 suspension"). 28 mg of iodine, 4 ml of acetone and 2 ml of deionized water were added to 100 ml of ethanol and stirred with magnetic stirrer and/or sonicated, and the solution was cooled in an ice bath till the iodine was dissolved (herein "charging solution"). The P-25 suspension was added to the charging solution and mixed, followed by sonication during 15 min (Ultrasonic Processor VCX-750, Sonics and Materials, Inc.) in order to homogenize the mixture with cooling of the suspension in an ice bath.

FIG. 1 shows the distribution of $TiO_2$ particle size in the final suspension as measured by Zetasizer 3000 HS (Malvern Instruments Ltd., UK) 30 min after suspension preparation. Three consequent measurements were made in the same dish without stirring. It could be seen that the mean size of the particles was around 60 nm and the suspension was highly stable. Under stirring, the suspension was stable during few days and could be used for high quality nanoporous titania films fabrication by electrophoretic deposition (EPD).

Without preliminary treatment with acetylacetone solution, i.e. only with the additives iodine, acetone and water, the mean particles size in ethanol suspension was 88 nm in the first measurement moving to 98 nm in the third measurement. In other words, the suspension was much less stable when the acetylacetone step was omitted, and accordingly, the quality of electrophoretically deposited titania films was worse. It is worth noting that, in this specific composition of the suspension, independent of the acetylacetone step, the P-25 particles were charged positively due to protons ($H^+$ ions) adsorption, thus during EPD these particles moved to the negative electrode, i.e. the cathode.

Example 2

Preparation of a Stable Antimony-doped Tin Oxide Nanoparticles Suspension Using an Ethanol-based Charging Solution 1 g of antimony-doped tin oxide nanoparticles (Aldrich) was mixed with 150 ml of ethanol and 0.4 ml of ethyleneglycol, and stirred with magnetic stirrer for 24 h in a closed vessel. The solution was then sonicated using an Ultrasonic Processor VCX-750 (Sonics and Materials, Inc.) during 10 min, with cooling of the suspension in an ice bath (herein "nanoparticles suspension"). 30 mg of iodine, 4 ml of acetone and 2 ml of deionized water were added to 100 ml of ethanol and stirred with magnetic stirrer and/or sonicated, and the solution was cooled in an ice bath till the iodine was dissolved (herein "charging solution"). After that, the nanoparticles suspension was added to the charging solution and mixed. Sonication was carried out for 16 min with cooling of the suspension in an ice bath. As a result, a stable suspension of antimony-doped tin oxide nanoparticles was obtained, and high quality films of controlled thickness were produced by EPD.

It is interesting and new that the antimony-doped tin oxide nanoparticles of the prepared suspension were charged negatively by iodide ions and during EPD moved to the positive electrode, i.e. anode, where they deposited. The creation of iodide ions in this system took place due to the following reactions (Koura et al., 1995):

(1)

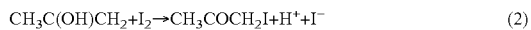

(2)

The first reaction is a keto-enol equilibrium catalyzed by water and iodine, followed by the second reaction between the enol-acetone and iodine, giving $H^+$ ions and $I^-$ ions.

The surface of the antimony-doped tin oxide nanoparticles in the mentioned suspension adsorbed iodide ions rather than protons, apparently due to preliminary adsorption of ethyleneglycol.

Without preliminary treatment of the nanoparticles with ethyleneglycol, i.e. only with the additives iodine, acetone and water, it was impossible to obtain a stable suspension and the EPD process was impossible too.

Example 3

Preparation of a Stable Indium-tin Oxide Nanoparticles Suspension Using an Ethanol-based Charging Solution 2.5 g of indium-tin oxide nanoparticles (Aldrich) were thermotreated at 350° C. in an oven during 30 min for removal of adsorbed water and organic impurities. After cooling to room temperature the nanoparticles were mixed with 150 ml of ethanol and 0.4 ml of acetylacetone. The suspension obtained was stirred with magnetic stirrer during 15 h in a closed vessel (herein "nanoparticles suspension"). 35 mg of iodine, 5 ml of acetone and 2.5 ml of deionized water were added to 100 ml of ethanol and stirred with magnetic stirrer and/or sonicated, while the solution was cooled in an ice bath till iodine was dissolved (herein "charging solution"). At this point, the nanoparticles suspension was added to the charging solution and sonicated for 16 min using an Ultrasonic Processor VCX-750 (Sonics and Materials, Inc.) with cooling of the suspension in an ice bath. As a result, a stable suspension of indium-tin oxide nanoparticles was obtained, and high quality films of controlled thickness were produced by EPD.

In this suspension, the indium-tin oxide nanoparticles were charged positively due to protons ($H^+$ ion) adsorption, thus during EPD they moved towards the negative electrode, i.e. cathode. Under stirring with magnetic stirrer in the sealed vessel at ambient conditions the prepared suspension was stable at least several months, and high quality nanoporous indium-tin oxide films of controlled thickness were obtained.

Example 4

Preparation of a Stable Titania Nanoparticles Suspension Using a Methanol-based Charging Solution 0.65 g of commercially available titania nanopowder P-90 (Degussa AG, Germany) was mixed with 150 ml of methanol and 0.4 ml of acetylacetone, and stirred with magnetic stirrer for 24 h in a closed vessel (herein "P-90 suspension"). 27 mg of iodine, 4 ml of acetone and 2 ml of deionized water were added to 100 ml of methanol and stirred with magnetic stirrer and/or sonicated, and the solution was cooled in an ice bath till the iodine was dissolved (herein "charging solution"). The P-90 suspension was added to the charging solution and mixed, followed by sonication during 15 min (Ultrasonic Processor VCX-750, Sonics and Materials, Inc.) in order to homogenize the mixture with cooling of the suspension in an ice bath.

The prepared suspension was used for high quality nanoporous titania films fabrication by electrophoretic deposition (EPD). In this case, the P-90 particles were charged positively due to protons ($H^+$ ion) adsorption, thus during EPD these particles moved to the negative electrode, i.e. the cathode.

Example 5

Preparation of a Stable Titania Nanoparticles Suspension Using an Ethanol-isopropanol Mixture-based Charging Solution 1 g of commercially available titania nanopowder P-25 (Degussa AG, Germany) was mixed with 150 ml of isopropanol and 0.6 ml of acetylacetone, and stirred with magnetic stirrer for 24 h in a closed vessel (herein "P-25 suspension"). 42 mg of iodine, 6 ml of acetone and 3 ml of deionized water were added to a mixture of 50 ml of isopropanol and 50 ml of ethanol and stirred with magnetic stirrer and/or sonicated, and the solution was cooled in an ice bath till the iodine was dissolved (herein "charging solution"). The P-25 suspension was added to the charging solution and mixed, followed by sonication during 15 min (Ultrasonic Processor VCX-750, Sonics and Materials, Inc.) in order to homogenize the mixture with cooling of the suspension in an ice bath. The prepared suspension was used for high quality nanoporous titania films fabrication by electrophoretic deposition (EPD).

REFERENCES

Koura, N. Tsukamoto, T. Shoji, H. Hotta, T., Preparation of various oxide films by an electrophoretic deposition method: a study of the mechanism, *Jpn. J. Appl. Phys.*, 1995, 34, 1643-1647

Sarkar, P. Nicholson, P. S., Electrophoretic deposition (EPD): mechanisms, kinetics, and applications to ceramics, *J. Am. Ceram. Soc.*, 1996, 79, 1897-2002

Special Issue on "Electrophoretic deposition: fundamentals and applications", *J. Mater. Sci.*, 2004, 39

Zhitomirsky, I., Cathodic electrodeposition of ceramic and organoceramic materials. Fundamental aspects, *Advances in Colloid and Interface Science*, 2002, 97, 279-317

Zhitomirsky, I., Cathodic electrophoretic deposition of diamond particles, *Mater. Lett.*, 1998, 37, 72-78

The invention claimed is:

1. A method for the preparation of a stable suspension of metal oxide nanoparticles, said method comprising:
   (i) treatment of metal oxide nanoparticles with a non-ionic compound capable of forming a complex with the metal atom of said metal oxide, in a polar organic solvent, under conditions that enhance adsorption of said compound on the particle surface; and
   (ii) addition of the suspension obtained in step (i) to a charging solution consisting of iodine, acetone and deionized water in a polar organic solvent, under mixing, followed by sonication of the suspension.

2. The method of claim 1, wherein the metal oxide is an oxide of a metal selected from a transition metal, Al, In, Sn, Mg, Be, B, Si or a mixture thereof.

3. The method of claim 2, wherein the transition metal is Sc, Ti, V, Cr, Mn, Fe, Co, Ni, Cu or Zn.

4. The method of claim 2, wherein the metal oxide is titanium oxide, indium-tin oxide or tin oxide, optionally doped by antimony.

5. The method of claim 1, wherein the non-ionic compound capable of forming a complex with the metal atom of said metal oxide is acetylacetone or ethyleneglycol.

6. The method of claim 1, wherein the polar organic solvent is a $C_1$-$C_6$ alkanol.

7. The method of claim 6, wherein the polar organic solvent is ethanol.

8. The method of claim 1, wherein the conditions that enhance adsorption of said compound on the particle surface are stirring, milling and/or ultrasound sonication conditions.

9. The method of claim 8, wherein the conditions are stirring and/or sonication.

10. The method of claim 1, wherein the metal oxide nanoparticles are initially treated for cleaning their surface to remove impurities.

11. The method of claim 10, wherein the metal oxide nanoparticles are treated by thermal treatment, an inorganic acid and/or a non-ionic compound capable of forming a complex with the metal atom of said metal oxide.

12. The method of claim 11, wherein the inorganic acid is nitric acid or hydrochloric acid, and the non-ionic compound capable of forming a complex with the metal atom of said metal oxide is acetylacetone or ethyleneglycol.

13. The method of claim 1, wherein:
the metal oxide is titanium oxide or indium-tin oxide, and the compound capable of forming a complex with the metal atom of said metal oxide is acetylacetone; or
the metal oxide is antimony-doped tin oxide, and the compound capable of forming a complex with the metal atom of said metal oxide is ethyleneglycol.

14. The method of claim 6, wherein the $C_1$-$C_6$ alkanol is selected from the group consisting of methanol, ethanol, propanol, isopropanol, butanol, isobutanol, sec-butanol, tert-butanol, pentanol, neopentanol, sec-pentanol, hexanol and a mixture thereof.

* * * * *